US012565041B2

(12) United States Patent
Tse et al.

(10) Patent No.: US 12,565,041 B2
(45) Date of Patent: Mar. 3, 2026

(54) ELECTROHYDRODYNAMIC PRINTER WITH FLUIDIC EXTRACTOR

(71) Applicant: The Regents of the University of Michigan, Ann Arbor, MI (US)

(72) Inventors: Lai Yu Leo Tse, Ann Arbor, MI (US); Ethan McMillian, Grand Haven, MI (US); Kira Barton, Ann Arbor, MI (US)

(73) Assignee: THE REGENTS OF THE UNIVERSITY OF MICHIGAN, Ann Arbor, MI (US)

( * ) Notice: Subject to any disclaimer, the term of this patent is extended or adjusted under 35 U.S.C. 154(b) by 39 days.

(21) Appl. No.: 18/266,742

(22) PCT Filed: Dec. 10, 2021

(86) PCT No.: PCT/US2021/062917
§ 371 (c)(1),
(2) Date: Jun. 12, 2023

(87) PCT Pub. No.: WO2022/125965
PCT Pub. Date: Jun. 16, 2022

(65) Prior Publication Data

US 2024/0059060 A1 Feb. 22, 2024

Related U.S. Application Data

(60) Provisional application No. 63/123,985, filed on Dec. 10, 2020.

(51) Int. Cl.

| | |
|---|---|
| ***B41J 2/09*** | (2006.01) |
| ***B41J 2/095*** | (2006.01) |
| ***B41J 2/165*** | (2006.01) |

(52) U.S. Cl.
CPC ........... *B41J 2/095* (2013.01); *B41J 2/16517* (2013.01)

(58) Field of Classification Search
CPC ........ B41J 2/095; B41J 2/16517; B41J 2/075; B41J 2/09; B41J 2/105; B41J 2002/031; B41J 2002/032
See application file for complete search history.

(56) References Cited

U.S. PATENT DOCUMENTS 6,302,331 B1 10/2001 Dvorsky et al.
7,682,002 B2 * 3/2010 Brost ......................... B41J 2/09 347/77

(Continued)

FOREIGN PATENT DOCUMENTS

CN 110039903 A 7/2019
JP H11198417 A 7/1999

(Continued)

OTHER PUBLICATIONS

International Search Report corresponding to PCT/US2021/062917, dated Apr. 13, 2022, 4 pages.

(Continued)

*Primary Examiner* — Kristal Feggins
(74) *Attorney, Agent, or Firm* — Reising Ethington P.C.

(57) ABSTRACT

An electrohydrodynamic printer has a fluidic extractor. A stream of liquid or carrier fluid at a different electrical potential than the printing fluid passes by an extraction opening to extract printing fluid from the extraction opening. The stream of liquid can be a continuous stream, a uniform stream of droplets, or a non-uniform stream of droplets. The extracted printing fluid can merge with the extraction fluid to be carried to a printing surface for deposition. The stream of extraction fluid can be intermittently charged to intermit- (Continued)

tently extract printing fluid such that selective portions of the stream do not extract printing fluid.

20 Claims, 5 Drawing Sheets

(56) References Cited

U.S. PATENT DOCUMENTS

| | | | | |
|---|---|---|---|---|
| 7,938,517 | B2 * | 5/2011 | Xie | B41J 2/09 347/77 |
| 2002/0041317 | A1 | 4/2002 | Kashiwazaki et al. | |
| 2014/0009523 | A1 | 1/2014 | Marcus | |
| 2014/0322451 | A1 | 10/2014 | Barton et al. | |
| 2018/0304621 | A1 | 10/2018 | Byun | |
| 2020/0298563 | A1 | 9/2020 | Visser et al. | |
| 2020/0361146 | A1 | 11/2020 | Zhou et al. | |

FOREIGN PATENT DOCUMENTS

| | | | |
|---|---|---|---|
| JP | 2002088287 | A | 3/2002 |
| JP | 2014515324 | A | 6/2014 |
| JP | 2017136863 | A | 8/2017 |
| WO | 2005079132 | A2 | 9/2005 |
| WO | 2012162082 | A1 | 11/2012 |

OTHER PUBLICATIONS

Written Opinion corresponding to PCT/US2021/062917, dated Apr. 13, 2022, 5 pages.

Japanese Notice of Grounds of Rejection corresponding to application 2023-535506, dated Jun. 25, 2024, 3 pages.

Extended European Search Report corresponding to application 21904511.9, dated Sep. 23, 2024, 10 pages.

Korean Notification of Grounds of Refusal corresponding to application 10-2023-7023183, dated Mar. 31, 2025, 8 pages.

* cited by examiner

ELECTROHYDRODYNAMIC PRINTER WITH FLUIDIC EXTRACTOR

TECHNICAL FIELD

The present disclosure relates generally to printing and, more particularly, to electrohydrodynamic printing.

BACKGROUND

Electrohydrodynamic printing, also known as e-jet printing, is a printing technique that relies on an electric field to extract a charged or polarized printing fluid from a printing nozzle for deposition on a printing surface. E-jet printing is capable of very high-resolution printing compared to other drop-on-demand or stream printing methods with droplet size and spatial accuracy on a sub-micron or nanometer scale. Early e-jet printing was limited to electrically conductive printing surfaces because the printing surface was one of the electrodes between which the electric field was produced. Consistency with the electric field was also problematic due to the deposited ink causing interference with the field as printing progressed. U.S. Pat. No. 9,415,590 to Barton, et al. addressed these and other problems via clever ink extraction and directing techniques that did not rely on a conductive printing surface.

SUMMARY

In accordance with various embodiments, an electrohydrodynamic printer has a fluidic extractor.

In various embodiments, the extractor is a stream of carrier fluid that merges with extracted printing fluid and carries the printing fluid toward a printing surface.

In various embodiments, the extractor is a stream of liquid at a different electrical potential than a printing fluid extracted from an extraction opening of a printing fluid source.

In various embodiments, the extractor is a continuous stream of liquid.

In various embodiments, the extractor is a uniform stream of droplets.

In various embodiments, each of a first portion of droplets extracts a droplet of the printing fluid and each of a second portion of droplets does not extract a droplet of the printing fluid.

In various embodiments, a first portion of droplets carries extracted printing fluid and is directed to a printing surface, and a second portion of droplets is not directed to the printing surface.

In various embodiments, the extractor is a non-uniform stream of droplets.

In accordance with various embodiments, a printer includes a first nozzle and a second nozzle. The first nozzle is configured to direct a stream of carrier fluid toward a printing surface, and the second nozzle is configured to provide a printing fluid at an extraction opening. The stream of carrier fluid passes by the extraction opening when flowing toward the printing surface. A difference in electrical potential between the carrier fluid and the printing fluid causes the printing fluid to be extracted from the second nozzle.

In various embodiments, extracted printing fluid merges with the stream of carrier fluid to be carried toward the printing surface.

In various embodiments, the carrier fluid is uniformly pressurized in the first nozzle so that the stream of carrier fluid is a continuous stream.

In various embodiments, a pressure of the carrier fluid in the first nozzle varies at a constant frequency so that the stream of carrier fluid is a uniform stream of droplets.

In various embodiments, the printer includes a piezoelectric element configured to deform at a constant frequency to vary the pressure of the carrier fluid in the first nozzle.

In various embodiments, the printer includes an electrode located external to the first nozzle. The stream of carrier fluid is charged by the electrode to provide at least a portion of the difference in electrical potential.

In various embodiments, the printer includes an electrode configured to charge only a portion of the stream of carrier fluid so that the stream of carrier fluid extracts printing fluid when a portion of the stream of carrier fluid passes by the extraction opening and does not extract printing fluid when an uncharged portion of the stream of carrier fluid passes by the extraction opening.

In various embodiments, a portion of the stream of carrier fluid passes by the extraction opening without extracting printing fluid and is collected and returned to a carrier fluid source that supplies the first nozzle with the carrier fluid.

In various embodiments, the printer is a drop-on-demand printer, and the stream of carrier fluid is a stream of droplets. Each droplet of carrier fluid extracts a droplet of printing fluid from the extraction opening and carries the respective droplets of printing fluid to the printing surface.

In various embodiments, the carrier fluid has a viscosity that is less than 10 centipoise, and the printing fluid has a viscosity that is greater than 30 centipoise.

In various embodiments, the difference in electrical potential is at least 500V, and the stream of carrier fluid has a velocity sufficiently high to maintain a gap between the stream of carrier fluid and the extraction opening of the second nozzle.

In various embodiments, the printing fluid is soluble in the carrier fluid, and the difference in electrical potential attracts the stream of carrier fluid onto the first nozzle in a cleaning mode of the printer.

It is contemplated that any number of the individual features of the above-described embodiments and of any other embodiments depicted in the drawings or description below can be combined in any combination to define an invention, except where features are incompatible.

DESCRIPTION OF EMBODIMENTS

Figure 1:
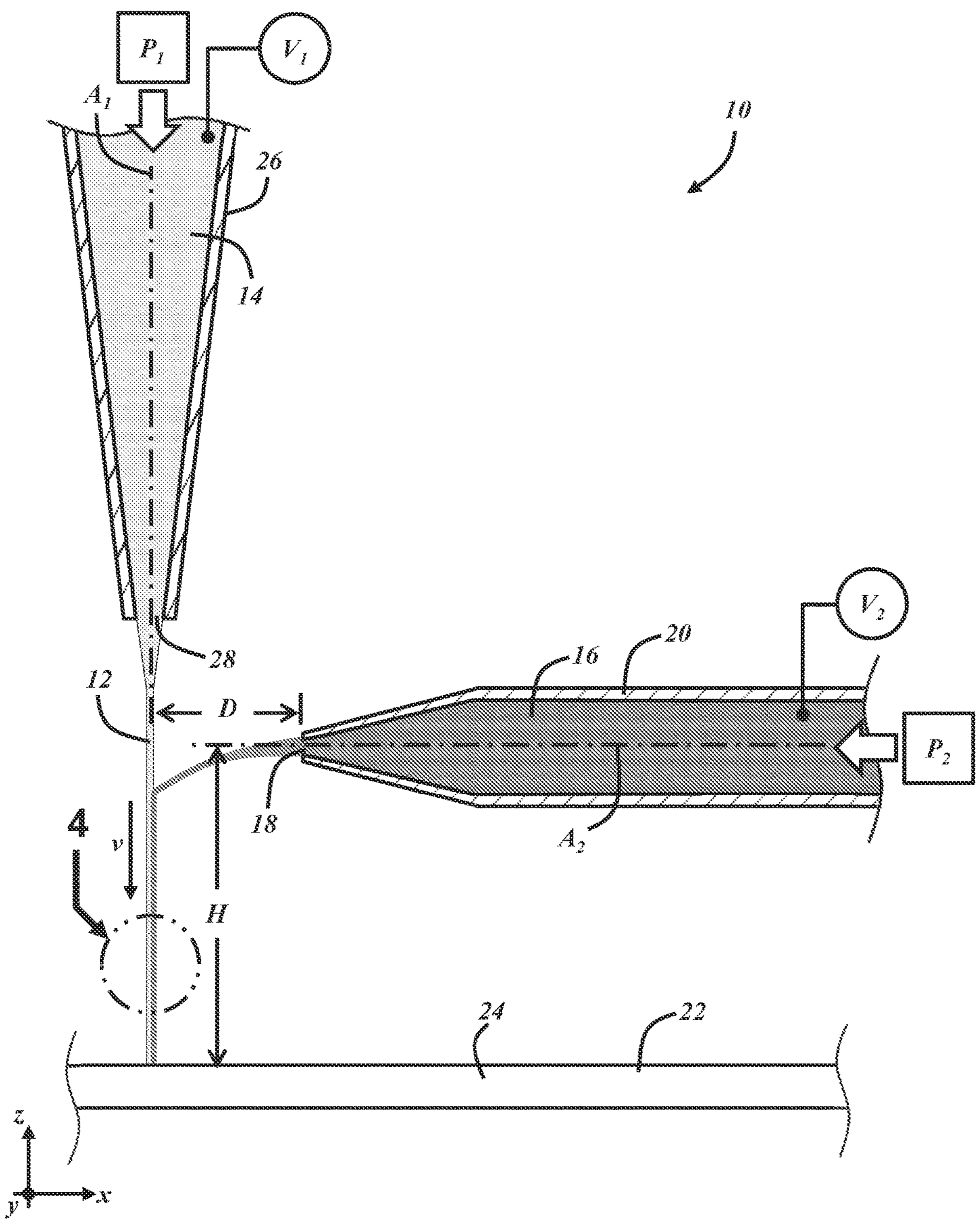
FIG. 1 is a cross-sectional view of an electrohydrodynamic printer with a fluidic extractor in the form of a continuous stream.

FIG. 1 schematically illustrates a portion of an electrohydrodynamic (or e-jet) printer 10 equipped with a fluidic extractor 12. The fluidic extractor 12 is itself a jet or stream of carrier fluid 14 that is at a different electrical potential than a printing fluid 16 provided at an extraction opening 18 of an ink nozzle 20. When the stream of fluid passes by the extraction opening 18 with a sufficient combination of difference in electrical potential ($V_1-V_2$) and distance (D), printing fluid 16 is extracted from the ink nozzle 20 and merges with the extraction stream 12 to be carried toward a printing surface 22, such as a surface of a substrate 24 or a previously deposited layer of printed material. Employment of the fluidic extractor 12 enjoys the benefits of a solid-state extractor, such as those detailed by Barton et al. in the aforementioned U.S. patent, while additionally addressing certain problems that can arise with solid-state extractors, such as the potential for electrical arcing between the ink nozzle and extractor, ink build-up on the extractor, and a relatively limited throw distance (H) between the ink extraction point and the printing surface 22. The fluidic extractor enables printing of high viscosity fluids with a throw distance normally associated with industrial continuous inkjet (CI) printers.

In the example of FIG. 1, the printer 10 includes a first nozzle 26 containing the carrier fluid 14 and a second nozzle 20 (i.e., the ink nozzle) containing the printing fluid 16. As used herein, an ink or printing fluid is any fluid that flows under pressure. Some printing fluids can be solidified after deposition. Solidification can be via various mechanisms, such as solvent evaporation, chemical reaction, cooling, or sintering. In some cases, the printing fluid is a functional ink, which is a printing fluid that provides a function other than coloration once solidified on the surface on which it is printed. Examples of such functions include electrical conductivity, dielectric properties, physical structure (e.g., stiffness, elasticity, or abrasion resistance), electromagnetic shielding or filtering, optical properties, electroluminescence, bioactivity, etc. Some other printing fluids, such as a lubricant, are not intended to be solidified after deposition.

While not explicitly illustrated, the nozzles 20, 26 may be part of a print head of the printer 10, the print head being configured to move relative to the printing surface 22. The print head may for example include a housing or other structure that supports the nozzles 20, 26 and/or includes one or more connections configured to provide pressure on the fluids 14, 16 in the nozzles and voltage to the nozzles and/or their contained fluids. The printer 10 may also include other non-illustrated components, such as a base, a movement mechanism for moving the print head and printing surface 22 relative to each other, multiple ink nozzles 20 or carrier fluid nozzles 26, directionality field generators, on-board ink sources, means for pressurizing the fluids 14, 16 in the nozzles, pneumatic or other gas connectors, pressure controllers, or one or more power supplies and associated controllers to selectively control the extraction field generated between the extractor 12 and the extraction opening 18, to name a few examples.

The carrier fluid nozzle 26 is configured to direct the stream 12 of carrier fluid toward the printing surface 22, and the ink nozzle 20 is configured to provide the printing fluid 16 at the extraction opening 18. The relative orientation of the nozzles 20, 26 is such that the stream 12 of carrier fluid passes by the extraction opening 18 when flowing toward the printing surface 22. In the illustrated example, the central longitudinal axes $A_1$, $A_2$ of the respective nozzles 26, 20 intersect in an x-z plane. The first nozzle axis $A_1$ is vertical and perpendicular to the printing surface 22, and the second nozzle axis $A_2$ is horizontal and parallel with the printing surface in FIG. 1. These nozzle orientations are not required, however, as the nozzle axes may intersect each other and/or the printing surface at oblique angles.

The carrier fluid 14 may be a relatively volatile liquid solvent (e.g., an organic solvent) with a relatively low viscosity, such as 10 centipoise (cps) or less. In some embodiments, the carrier fluid 14 includes a solvent or liquid that is also included in the printing fluid 16—e.g., a liquid in which a solid component of the printing fluid is dissolved, suspended, or emulsified. With a sufficiently high pressure $P_1$ applied to the fluid 14 in the nozzle 26, a high velocity stream 12 of carrier fluid is produced at a discharge opening 28 of the nozzle and directed toward the printing surface 22. The discharge opening 28 may be in a range from 1 μm to 100 μm, from 20 μm to 100 μm, or from 20 μm to 70 μm. The pressure $P_1$ may be in a range from 5 psi to 500 psi (34 kPa to 3.4 MPa). The pressure $P_1$ may be considerably higher than conventional low resolution CU ink pressures, which are typically below 50 psi. The high pressure $P_1$ on the carrier fluid 14 enables higher resolution printing when the stream of carrier fluid is a stream of droplets, as discussed further below.

The relatively high velocity (v) of the stream of carrier fluid may be both necessary and advantageous. Higher velocity may translate to higher-speed printing. But below a threshold velocity, the stream of carrier fluid will flow onto the ink nozzle 20 due to the voltage potential difference and the resulting electrical attraction. The threshold velocity is dependent on several factors, including the voltage potential ($V_1-V_2$), the distance (D) between the extractor 12 and the extraction opening 18, the viscosity of the printing fluid 16, the size of the extraction opening, and the electric conductivity of the fluids 14, 16. In one non-limiting example in which the voltage potential between the fluids 14, 16 is about 2000V, the threshold velocity is in a range from about 6 m/s to about 11 m/s. The printer 10 is capable of producing a stream of carrier fluid with a velocity (v) rivaling that of CIJ printers, such as in a range from 20 m/s to 50 m/s.

The carrier fluid 14 may be electrically conductive in some cases, which allows the carrier fluid to more readily accept a charge from the applied voltage ($V_1$). One specific example of a conductive carrier fluid is SIGNASPRAY® (Parker Laboratories, Inc., Fairfield, NJ, USA), which has an electrical conductivity greater than 20,000 μS/cm. Another example of a conductive carrier fluid 14 is a solvent with a suspension of metallic (e.g., silver) particles, such as nanoparticles. Of course, any solids content of the carrier fluid 14 will be present in the deposited ink. In other cases, the carrier fluid 14 is non-conductive. One example of a suitable non-conductive carrier fluid is isopropyl alcohol (IPA), which has an electrical conductivity of about 0.06 μS/cm. A non-conductive carrier fluid can increase the arcing threshold and allow use of higher voltages, which in turn enables a higher printing fluid extraction rate and a faster printing process. As noted above, the carrier fluid may include or may be a solvent that is also part of the printing fluid 16. In some cases, solvent that evaporates from the printing fluid 16 during travel from the extraction opening 18 to the printing surface is replenished by the carrier fluid so that the deposited fluid maintains the desired solvent content.

The printing fluid 16 may have a high viscosity relative to the carrier fluid 14. The viscosity of the printing fluid may for example be in a range from 1 cps to 300,000 cps. In various embodiments the viscosity of the printing fluid is 300,000 cps or less while also being greater than 10 cps, greater than 30 cps, greater than 100 cps, greater than 1000 cps, greater than 10,000 cps, or greater than 100,000 cps. Many functional inks have high viscosities due to the high solids content and/or particle size. The back pressure $P_2$ on the printing fluid 16 in the ink nozzle 20 may be low in comparison to the pressure $P_1$ in the other nozzle 26, such as between 0.5 psi and 200 psi (3.4 kPa to 1.4 MPa). The extraction opening 18 may be in a range from 1 μm to 200 μm. In one embodiment, the extraction opening 18 is in a range from 20 μm to 100 μm. Higher resolution printing typically requires a smaller extraction opening 18 such as a 1 μm to 2 μm opening.

The difference in electrical potential between the carrier fluid 14 and the printing fluid 16 before they merge along the fluidic extraction stream 12 may be in a range from 500V to 5000V, or 1000V to 5000V. Various combinations of applied voltages ($V_1$, $V_2$) are possible, and the voltages may be applied in various manners. For example, one or both of the nozzles 20, 26 may be formed from a conductive material, such as a metallic material (e.g., stainless steel), and the voltages are applied to the nozzles with the fluids 14, 16 in contact with the interior of the nozzles. In another example, each nozzle 20, 26 has a conductive portion with the voltages being applied to that portion of the nozzle. For example, the nozzles 20, 26 can be formed from a non-conductive material (e.g., plastic) with a metal layer plated or deposited on an internal surface, or the nozzles may include a conductive tip that includes corresponding extraction opening 18 or discharge opening 28. In other embodiments, each voltage is applied to an electrode that is at least partly immersed in the fluid in the nozzle or in a reservoir that supplies the nozzle.

In one example, the voltage on the printing fluid 16 is greater than the voltage on the carrier fluid 14 ($V_2>V_1$). For instance, a high voltage (500-5000V) may be applied to the printing fluid 16 while the carrier fluid 14 is grounded or floating with no voltage potential applied. This arrangement is particularly suitable when using a conductive carrier fluid. This is analogous to the favored arrangement with solid-state extractors, where the extractor is grounded and high-voltage pulses are applied to the printing fluid to cause the printing fluid to be attracted toward the extractor and, thereby, extracted from the ink nozzle. In this arrangement, the charge density at the extraction opening 18 is very high with a sharp nozzle tip, making it likely that the arcing threshold is higher than the extraction threshold, allowing extraction of the printing fluid 16 without arcing concerns. This arrangement may be limited by the fact that the printing surface 22 may be at the same electrical potential as the carrier fluid 14 (i.e., zero applied voltage or ground). This means that the high voltage printing fluid 16 can be attracted to both the stream 12 of carrier fluid and the printing surface 22—i.e., the proximity of the printing surface 22 to the ink nozzle 20 can affect the trajectory of extracted printing fluid. This can be problematic, for example, when printing onto a polymeric substrate at close proximity and/or using a non-conductive carrier fluid. When appropriate, use of a conductive carrier fluid in this arrangement can help alleviate such problems by making the carrier fluid a more dominant element in the electric field near the extraction opening 18.

In another example, the voltage on the printing fluid 16 is less than the voltage on the carrier fluid 14 ($V_2<V_1$). For instance, the high voltage may be applied to the carrier fluid 14 while the printing fluid 16 is grounded or floating with no voltage potential applied. In this arrangement, there is not a high charge density at the extraction opening 18 of the ink nozzle 20. It may therefore not be possible to extract some types of printing fluids with this arrangement. But for fluids that can be e-jet printed with a relatively low charge density, this arrangement will avoid substrate interference because the printing fluid 16 and substrate 24 are at the same electrical potential. The stream 12 of carrier fluid is the only attractive feature for the printing fluid in the entire system. Even if the printing surface 22 has some residual static charge, the magnitude of the charge on the stream of carrier fluid easily overcomes any attraction of the extracted printing fluid to the substrate. In some cases, it may be beneficial to not ground the printing fluid (i.e., to allow the printing fluid to have an electrically floating potential) to effectively limit the current flow in the event of arcing. The amount of charge that can pass from the carrier fluid to the printing fluid is limited, as there is no pathway for the charge to leave the printing fluid. Limiting the charge passing through the ink nozzle 20 can help reduce heat generated by arcing current, therefore reducing the chance of nozzle clogging with heat-curable printing fluids.

In other examples, non-zero voltages with opposite polarities are applied to the carrier fluid 14 and to the printing fluid 16. For example, a moderate voltage (e.g., $V_2$=500V to 1500V) may be applied to the printing fluid 16 in the ink nozzle 20 with a high magnitude negative voltage (e.g., $V_1$=−2000V to −5000V) applied to the carrier fluid 14 so that the extraction stream 12 is at a lower potential than the printing fluid 16 and the printing surface 22. In this arrangement, the potential difference between the ink nozzle and the substrate 24 and other nearby components is insufficient to extract printing fluid 16 from the nozzle, but the positive voltage supplied to the printing fluid is enough to impart some level of charge density charge density at the ink nozzle 20. The effect is that the negatively charged extractor stream 12 is the only feature that provides a difference in electrical potential that is sufficient to extract printing fluid when passing by the extraction opening 18. This reduces the probability that extracted printing fluid will be attracted to anything other than the stream of carrier fluid, with which the printing fluid merges to continue toward the printing surface.

In a specific embodiment, a 1000V charge is applied at the ink nozzle 20 and a −2000V charge is applied to the carrier fluid 14. These voltage levels are sufficient for the extracted printing fluid 16 to effectively differentiate between the stream 12 of carrier fluid and the substrate so that the extracted ink is more attracted to the extraction stream 12 and merges with the carrier fluid without significant competition from the substrate or other uncharged components. This is true even when the carrier fluid 14 is substantially non-conductive (e.g., IPA).

The throw distance (H) of the printing fluid may be in a range from 5 mm to 15 mm and is determined largely by the characteristics of the stream 12 of carrier fluid, which can be a continuous stream, a uniform stream of droplets, or a non-uniform stream of droplets (e.g., drop-on-demand). The rate of extraction of the printing fluid is determined by the voltage potential, back pressure (P2), distance (D) between the extraction opening 18 and the stream of carrier fluid, extraction opening size, and characteristics of the printing fluid 16 (e.g., conductivity, viscosity, etc.). The example of FIG. 1 depicts a continuous stream 12 of carrier fluid. When in the form of a continuous stream, the carrier fluid is not broken into individual droplets and is able to extract the printing fluid 16 in a continuous stream so that the two streams merge and continue toward the printing surface generally in the direction of the stream of carrier fluid.

Figure 2:
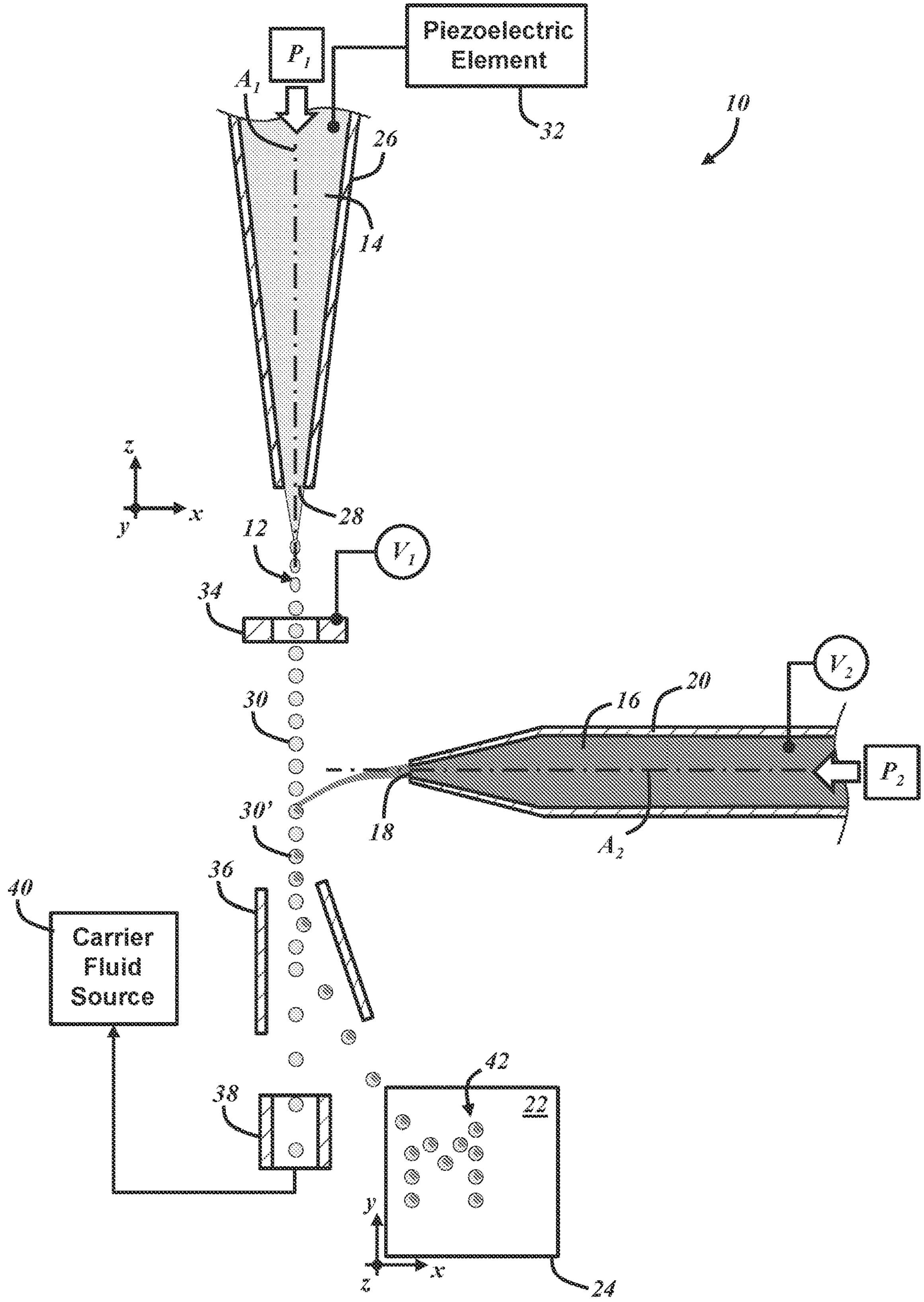
FIG. 2 is a cross-sectional view of the electrohydrodynamic printer with the fluidic extractor in the form of a uniform stream of droplets.

FIG. 2 schematically illustrates an example of the electrohydrodynamic printer 10 in which the extractor 12 is a uniform stream of droplets 30 of carrier fluid. As used here, "uniform" means that the droplets 30 of the stream 12 are evenly spaced in the direction of travel and the same size as one another. The delivery and formation of the stream of carrier fluid illustrated in FIG. 2 is analogous to the manner in which the jet of ink is produced in CIJ printing. In this case, however, it is the carrier fluid 14 and not the printing fluid 16 that is broken into droplets 30. The carrier fluid 14 in the nozzle 26 is pressurized at a pressure $P_1$. But unlike the continuous stream of carrier fluid of FIG. 1, to which a constant pressure is applied in the nozzle 26, the pressure $P_1$ applied to the carrier fluid 14 in the nozzle 26 is varied at a constant frequency. One manner of varying the pressure at a constant frequency is via a piezoelectric element 32. The piezoelectric element 32 mechanically deflects when a voltage is applied across it. The element 32 is arranged to increase the pressure in the nozzle 26 when it deflects—i.e., by slightly decreasing a volume of the carrier fluid 14 in the nozzle. The voltage to the piezoelectric element 32 can be applied at a very high frequency, such as an ultrasonic frequency (i.e., greater than 20 kHz), to break the stream of carrier fluid into the uniform stream of droplets 30 upon exiting the nozzle 26.

The stream of carrier fluid then passes by a charging element 34 that imparts an electrical charge to a portion of the droplets. In this example, the charging element 34 is a charging ring through which the stream of carrier fluid passes. The voltage $V_1$ is applied to the charging element 34 intermittently to selectively charge a portion of the passing droplets 30. In particular, only the droplets 30 intended to extract a droplet of printing fluid 16 from the ink nozzle 20 and continue to the printing surface 22 are charged. The charging element 34 may also be referred to as an electrode.

When passing by the extraction opening 18 of the ink nozzle 20, each droplet 30 of a first portion of the droplets of carrier fluid—that is, the charged droplets—extract a droplet of printing fluid 16, which merges with the respective droplet of carrier fluid to be carried toward the printing surface 22. A second portion of the droplets 30—i.e., the uncharged droplets—do not extract a droplet of printing fluid and merely continue in the original direction of the stream of carrier fluid.

After passing by the ink nozzle 20, the stream of carrier fluid then passes through a directionality unit 36. In this case, the directionality unit 36 includes a pair of oppositely charged plates. The second portion of uncharged droplets of carrier fluid is unaffected by the directionality unit 36 and continues along the original direction of the stream 12 and into a collector 38, where the carrier fluid is returned to a carrier fluid source 40 that supplies the nozzle 26 or stores the clean carrier fluid for reuse. The first portion of charged droplets 30', each now merged with a droplet of printing fluid, is directed away from the collector 38 by the directionality unit 36 and toward the printing surface 22 to be deposited in the desired location as part of a printed pattern 42.

In FIG. 2, the substrate 24 and printing surface 22 are schematically shown in plan view to illustrate the printed pattern 42 in the same figure as the print head. The magnitude of the charge applied to each charged droplet 30' can be the same and the voltage applied across the opposing faces of the directionality unit can be constant, with the print head and/or the substrate 24 moving relative to one another to produce the desired pattern 42. In such an arrangement, each charged droplet 30' carrying printing fluid is laterally deflected away from the axis $A_1$ of the stream of carrier fluid by the same amount, and relative substrate-to-print head movement is relied on for forming the desired pattern 42 of printed material.

In some embodiments, the charge applied to each charged droplet varies so that the effect of the directionality unit varies. In other words, more highly charged droplets are more affected by the directionality unit and are laterally deflected by a greater amount. Alternatively or additionally, the voltage across the directionality unit can be varied with a similar effect. In this manner, relative movement between the print head and the substrate 24 can be simpler. For instance, a plurality of differently charged droplets carrying printing fluid can be sequentially deposited on the printing surface 22 as a row of droplets in the x-direction with the print head not moving relative to the substrate 24 in the x-direction, then the substrate and/or print head can be indexed in the y-direction to begin another row of droplet deposition. The length of a row of droplets without print head or substrate movement in the direction of the row is of course limited to the total amount of deflection the directionality unit 36 is capable of. In some embodiments, the directionality unit 36 is configured to deflect charged droplets in more than one direction, such as the x-direction, the y-direction, and any combination of the x- and y-directions.

Figure 3:
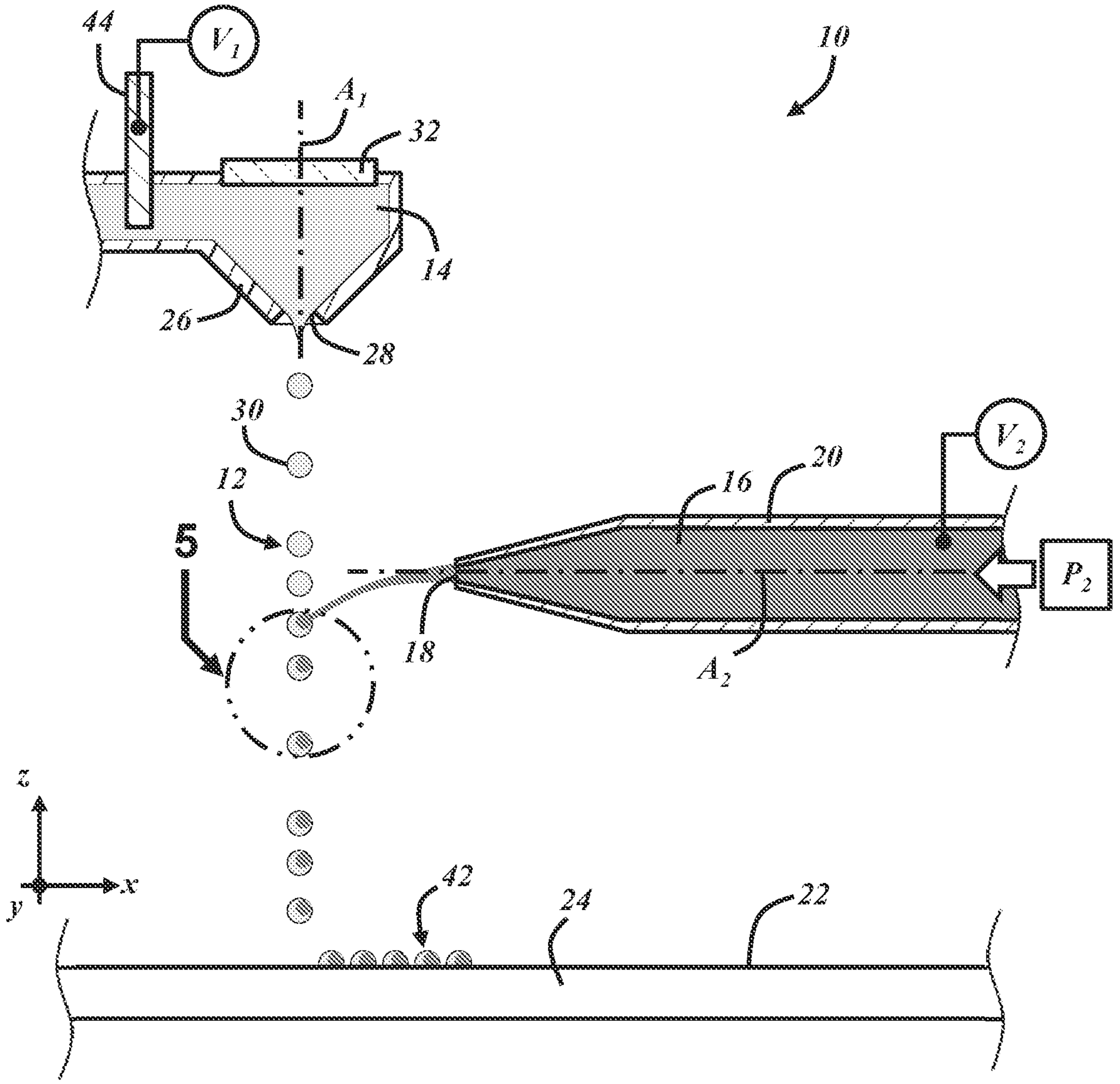
FIG. 3 is a cross-sectional view of the electrohydrodynamic printer with the fluidic extractor in the form of a non-uniform stream of droplets.

FIG. 3 schematically illustrates an example of the electrohydrodynamic printer 10 in which the extractor 12 is a non-uniform stream of droplets 30 of carrier fluid. In a non-uniform stream of droplets, the spacing between individual droplets varies from droplet to droplet. This configuration can perform as a drop-on-demand printer with droplets 30 of carrier fluid produced only as needed to extract a corresponding droplet of printing fluid 16 to carry to the printing surface 22. The delivery and formation of the stream of carrier fluid illustrated in FIG. 3 is analogous to the manner in which the jet of ink is produced in non-industrial inkjet printers. The carrier fluid 14 in the nozzle 26 is subjected to a pressure pulse when a droplet of carrier fluid is desired. In this case, each pressure pulse is provided by a piezoelectric element 32 deflecting in a direction that causes a small decrease in the working volume of carrier fluid 14. A corresponding volume of the carrier fluid 14 is released through the discharge opening 28 with each pressure pulse. The pressure pulses can be generated in other ways, such as via thermal energy (e.g., bubble jet). In another example, consistent with the drop-on-demand embodiment of FIG. 3, the carrier fluid 14 in the nozzle 26 is pressurized in a range from 5 psi to 150 psi, and a droplet release valve operated by a solenoid or piezoelectric element is used to create the stream of carrier fluid.

Each droplet 30 of the stream 12 of carrier fluid is charged, and each droplet therefore extracts a droplet of printing fluid 16 as it passes by the extraction opening 18 of the ink nozzle 20. Each extracted droplet of printing fluid merges with the a corresponding droplet of carrier fluid and is deposited on the printing surface. The printed pattern is controlled by relative movement of the print head and printing surface 22 in the x- and y-directions and by the timing of the pressure pulses and corresponding droplet formation. In this example, the carrier fluid is charged by the application of the voltage ($V_1$) via an electrode 44 in contact with the carrier fluid 14 in the nozzle 26. In other embodiments, the droplets of carrier fluid may pass by an electrode external to the nozzle 26 to be charged, as in FIG. 2. Because all of the droplets 30 of the stream of droplets are charged to extract printing fluid, no directionality field is required to direct charged droplets to the printing surface and uncharged droplets away from the printing surface. However, a directionality field can optionally be used for additional control over droplet trajectory, and the amount of charge on each droplet can be varied by varying the electrode or charging element voltage ($V_1$).

A high viscosity printing fluid 16 has been successfully printed using a stream of carrier fluid as the extractor. In a working example, the printing fluid 16 is a silver nano paste that is typically only printable by screen printing (DGP-NO, ANP Materials, Milpitas, CA, USA, www.anapro.com). This printing fluid has a viscosity between 50,000 and 150,000 cps and includes 70-80 wt % silver nanoparticles. The ink nozzle 20 has a 70 μm extraction opening 18 spaced from the extraction stream 12 by a distance (D) of 200 μm. The voltage potential between the carrier fluid 14 and the printing fluid 16 is 2000V. With the stream 12 of carrier fluid 14 at a velocity between 6 m/s and 11 m/s, the printing fluid 16 was extracted from the ink nozzle 20 and merged with the stream of carrier fluid to be carried to the printing surface.

Figure 4:
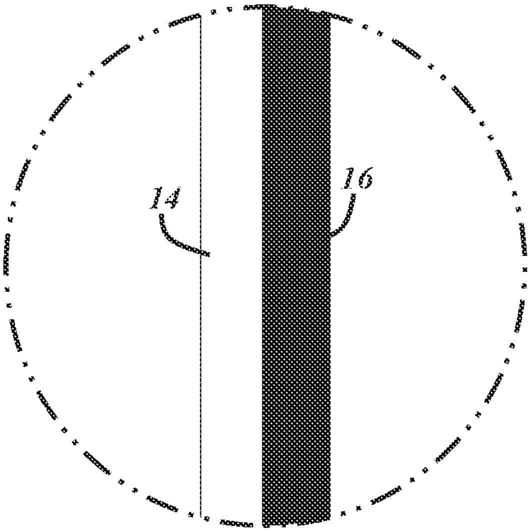
FIG. 4 is an enlarged view of a portion of FIG. 1 illustrating a stream of carrier fluid merged with an immiscible printing fluid.
Figure 5:
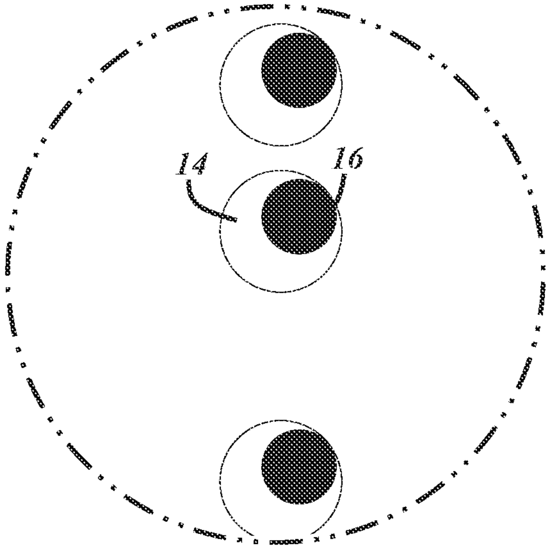
FIG. 5 is an enlarged view of a portion of FIG. 3 illustrating the stream of carrier fluid merged with an immiscible printing fluid.

FIGS. 4-7 illustrate different manners in which extracted printing fluid 16 merges with the stream of carrier fluid 14. FIG. 4 is an enlarged view of a portion of the continuous stream of carrier fluid 14 of FIG. 1. In this example, the printing fluid 16 is immiscible in the carrier fluid 14. The two fluids 14, 16 thus do not mix as they travel toward the printing surface. This may be a desirable condition to prevent the carrier fluid 14 from diluting the printing fluid 16, which would otherwise have its solvent-to-solute ratio changed if the carrier fluid and printing fluid are miscible. The carrier fluid 14 can be selected to have a very low boiling point (e.g., acetone) so that the carrier fluid at least partly evaporates on its way toward the printing surface so that the printing fluid 16 is deposited with minimal carrier fluid content. The same concepts apply to the stream of carrier fluid when in the form of uniform or non-uniform droplets 30, as shown in FIG. 5, which is an enlarged view of a portion of the stream of carrier fluid of FIG. 3.

Figure 6:
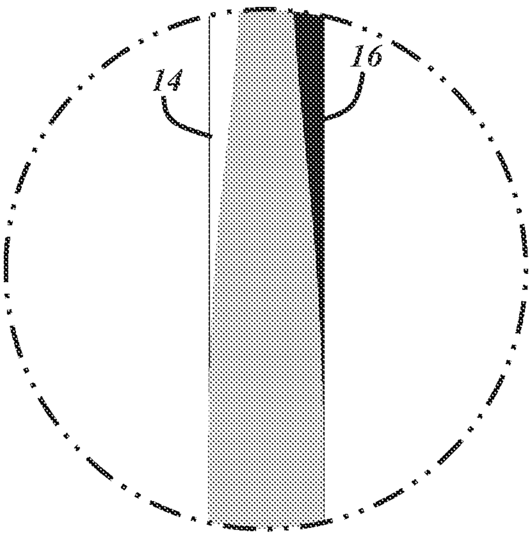
FIG. 6 is an alternative version of FIG. 4 in which the stream of carrier fluid is miscible with the printing fluid.
Figure 7:
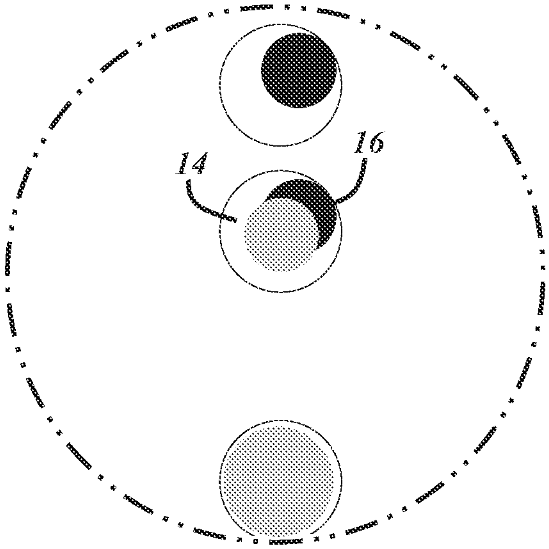
FIG. 7 is an alternative version of FIG. 5 in which the stream of carrier fluid is miscible with the printing fluid.

FIG. 6 is an alternative version of FIG. 4 in which the printing fluid 16 is miscible with the carrier fluid 14. The two fluids 14, 16 mix when they merge and/or as they travel toward the printing surface. This may be a desirable condition when the printing fluid 16 is formulated with a low boiling point solvent that partly evaporates during travel from the ink nozzle 20 to the printing surface. The carrier fluid 14 can include or can be the same solvent that evaporates from the printing fluid 16 and thereby replenish the evaporated solvent so that the printing fluid is deposited with a solvent-to-solute ratio very close to that of the printing fluid in the nozzle or at some different ratio. The same concepts apply to the stream of carrier fluid when in the form of uniform or non-uniform droplets 30, as shown in FIG. 7, which is an alternative version of FIG. 5 in which the printing fluid 16 is miscible with the carrier fluid 14.

Figure 8:
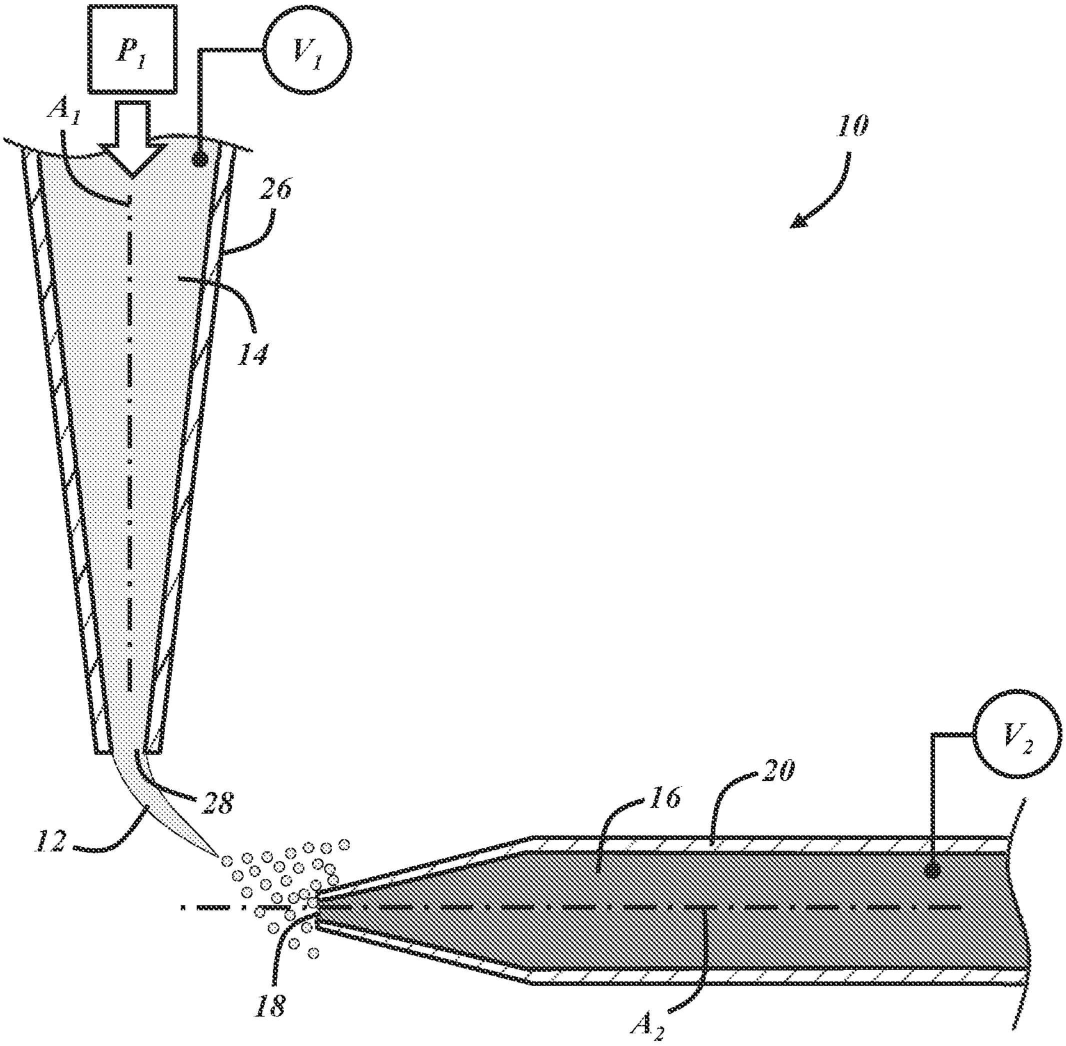
FIG. 8 is a view of the printer of FIG. 1 in a cleaning mode.

FIG. 8 illustrates a cleaning mode of the printer as applied to the configuration of FIG. 1. When the printing fluid 16 is soluble in or otherwise compatible with the carrier fluid 14, the carrier fluid can be used as a cleaning agent or an anti-clogging agent for the ink nozzle 20. When the printer is not printing, the back pressure can be removed from the printing fluid 16 and the pressure $P_1$ on the carrier fluid 14 can be reduced such that the velocity of the stream 12 of carrier fluid exiting the nozzle 26 is not high enough for the stream of carrier fluid to pass by the ink nozzle 20 when the voltages are applied to the respective fluids. As a result, the stream of carrier fluid is attracted onto the nozzle 20 and can help maintain a clean nozzle tip and prevent the printing fluid 16 from drying up or otherwise clogging the extraction opening 18.

It is to be understood that the foregoing description is of one or more embodiments of the invention. The invention is not limited to the particular embodiment(s) disclosed herein, but rather is defined solely by the claims below. Furthermore, the statements contained in the foregoing description relate to the disclosed embodiment(s) and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Further, the term "electrically connected" and the variations thereof is intended to encompass both wireless electrical connections and electrical connections made via one or more wires, cables, or conductors (wired connections). Other terms are to be construed using their broadest reasonable meaning unless they are used in a context that requires a different interpretation.

The invention claimed is:

1. An electrohydrodynamic printer having a fluidic extractor, wherein the extractor is a stream of liquid at a different electrical potential than a printing fluid provided at an extraction opening such that the stream of liquid extracts the printing fluid from the extraction opening when the stream of liquid passes by the extraction opening.

2. The printer of claim 1, wherein the extractor is a stream of carrier fluid that merges with extracted printing fluid and carries the printing fluid toward a printing surface.

3. The printer of claim 1, wherein the stream of liquid is a continuous stream.

4. The printer of claim 1, wherein the stream of liquid is a uniform stream of droplets.

5. The printer of claim 4, wherein each of a first portion of the droplets extracts a droplet of the printing fluid and each of a second portion of the droplets does not extract a droplet of the printing fluid.

6. The printer of claim 5, wherein the first portion of the droplets carries extracted printing fluid and is directed to a printing surface, and the second portion of the droplets is not directed to the printing surface.

7. The printer of claim 1, wherein the stream of liquid is a non-uniform stream of droplets.

8. A printer, comprising:

a first nozzle configured to direct a stream of carrier fluid toward a printing surface; and a second nozzle configured to provide a printing fluid at an extraction opening, wherein the stream of carrier fluid passes by the extraction opening when flowing toward the printing surface, and wherein a difference in electrical potential between the carrier fluid and the printing fluid causes the printing fluid to be extracted from the second nozzle.

9. The printer of claim 8, wherein extracted printing fluid merges with the stream of carrier fluid to be carried toward the printing surface.

10. The printer of claim 8, wherein the carrier fluid is uniformly pressurized in the first nozzle so that the stream of carrier fluid is a continuous stream.

11. The printer of claim 8, wherein a pressure of the carrier fluid in the first nozzle varies at a constant frequency so that the stream of carrier fluid is a uniform stream of droplets.

12. The printer of claim 11, further comprising a piezoelectric element configured to deform at said constant frequency to vary the pressure of the carrier fluid in the first nozzle.

13. The printer of claim 8, further comprising an electrode located external to the first nozzle, wherein the stream of carrier fluid is charged by the electrode to provide at least a portion of said difference in electrical potential.

14. The printer of claim 8, further comprising an electrode configured to charge only a portion of the stream of carrier fluid so that the stream of carrier fluid extracts printing fluid when said portion of the stream of carrier fluid passes by the extraction opening and does not extract printing fluid when an uncharged portion of the stream of carrier fluid passes by the extraction opening.

15. The printer of claim 8, wherein a portion of the stream of carrier fluid passes by the extraction opening without extracting printing fluid, said portion of the stream of carrier fluid being collected and returned to a carrier fluid source that supplies the first nozzle with the carrier fluid.

16. The printer of claim 8, wherein the printer is a drop-on-demand printer, the stream of carrier fluid being a stream of droplets, each droplet of carrier fluid extracting a droplet of printing fluid from the extraction opening and carrying the respective droplets of printing fluid to the printing surface.

17. The printer of claim 8, wherein the carrier fluid has a viscosity that is less than 10 centipoise and the printing fluid has a viscosity that is greater than 30 centipoise.

18. The printer of claim 8, wherein said difference in electrical potential is at least 500V and the stream of carrier fluid has a velocity sufficiently high to maintain a gap between the stream of carrier fluid and the extraction opening of the second nozzle.

19. The printer of claim 8, wherein the printing fluid is soluble in the carrier fluid and the difference in electrical potential attracts the stream of carrier fluid onto the first nozzle in a cleaning mode of the printer.

20. The printer of claim 8, wherein the carrier fluid is liquid.

* * * * *